United States Patent [19]

Sutterlin et al.

[11] Patent Number: 5,579,335

[45] Date of Patent: Nov. 26, 1996

[54] SPLIT BAND PROCESSING FOR SPREAD SPECTRUM COMMUNICATIONS

[75] Inventors: Philip H. Sutterlin; J. Marcus Stewart, both of San Jose, Calif.

[73] Assignee: Echelon Corporation, Palo Alto, Calif.

[21] Appl. No.: 534,574

[22] Filed: Sep. 27, 1995

[51] Int. Cl.⁶ ................................................. H04L 27/30
[52] U.S. Cl. .......................................................... 375/200
[58] Field of Search ..................................... 375/343, 349, 375/350, 365, 367, 208, 200, 260, 240, 368

[56] References Cited

U.S. PATENT DOCUMENTS

| | | | |
|---|---|---|---|
| 3,112,452 | 11/1963 | Kirkpatrick | 375/200 |
| 4,443,799 | 4/1984 | Rubin | 375/343 |
| 4,691,326 | 9/1987 | Tsuchiya | 375/207 |
| 5,090,024 | 2/1992 | Vander Mey et al. | 375/200 |
| 5,263,050 | 11/1993 | Sutterlin et al. | 375/200 |
| 5,278,862 | 11/1994 | Vander Mey | 375/200 |
| 5,289,498 | 2/1994 | Hurlbut et al. | 375/200 |
| 5,359,625 | 10/1994 | Vander Mey et al. | 375/200 |

*Primary Examiner*—Stephen Chin
*Assistant Examiner*—Kevin Kim
*Attorney, Agent, or Firm*—Blakely, Sokoloff, Taylor & Zafman

[57] ABSTRACT

A method and apparatus for compensating for distortion in a spread spectrum communications system particularly useful where the spread spectrum is transmitted over a power line. The information carrying signal (ICS) is split into two sub-bands and the ICS in one sub-band (or a correlation value determined from the ICS in that sub-band) is delayed relative to the other sub-band. The ICS (or correlation values) from the two sub-bands are recombined after the delay and processed in an ordinary manner. The time delay is selected so as to compensate for the distortion. In one embodiment, the correlation peaks in each of the sub-bands are examined and the time delay is determined by, in effect, aligning the peaks in the two sub-bands in time so that when the two sub-bands are combined, a sharper correlation peak is obtained.

14 Claims, 4 Drawing Sheets

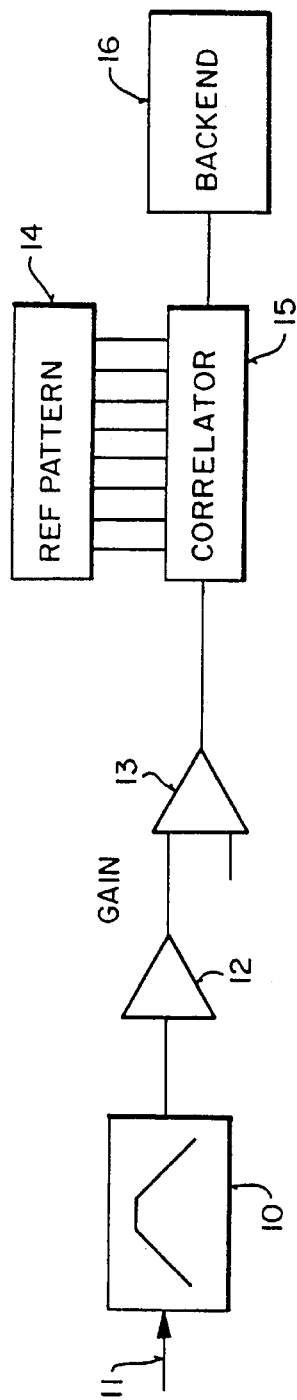
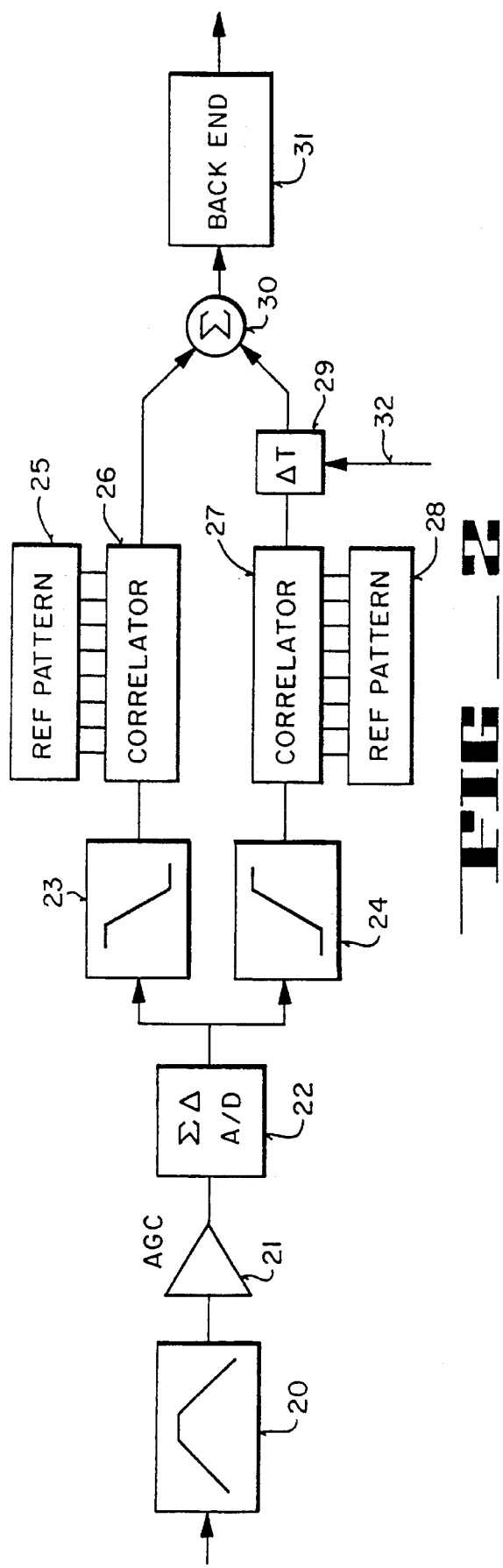

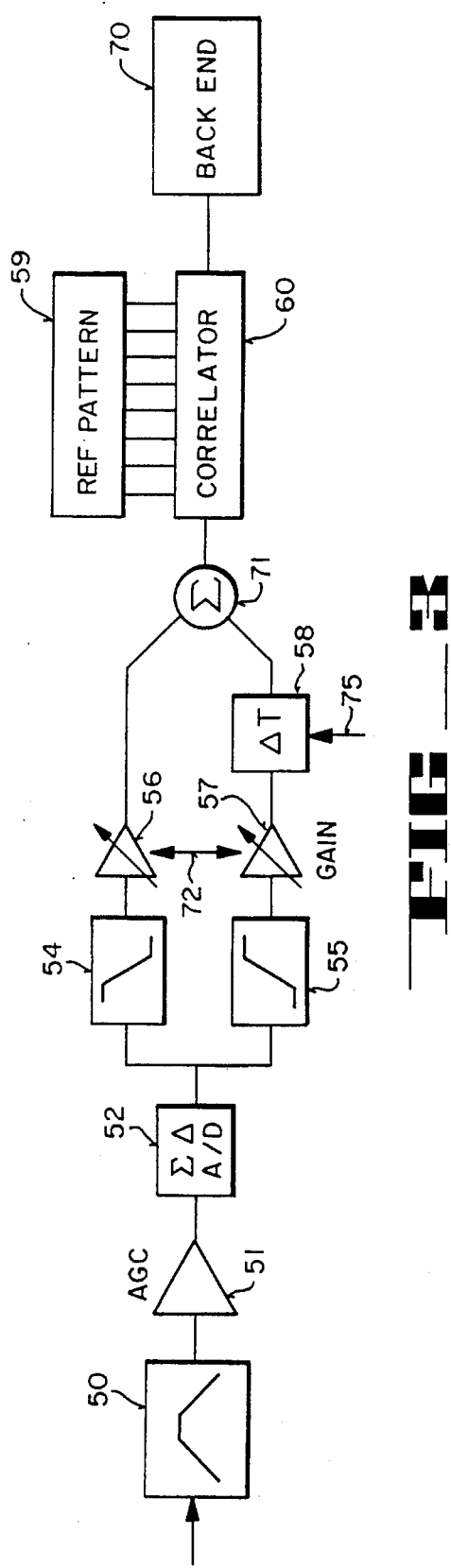
FIG_3
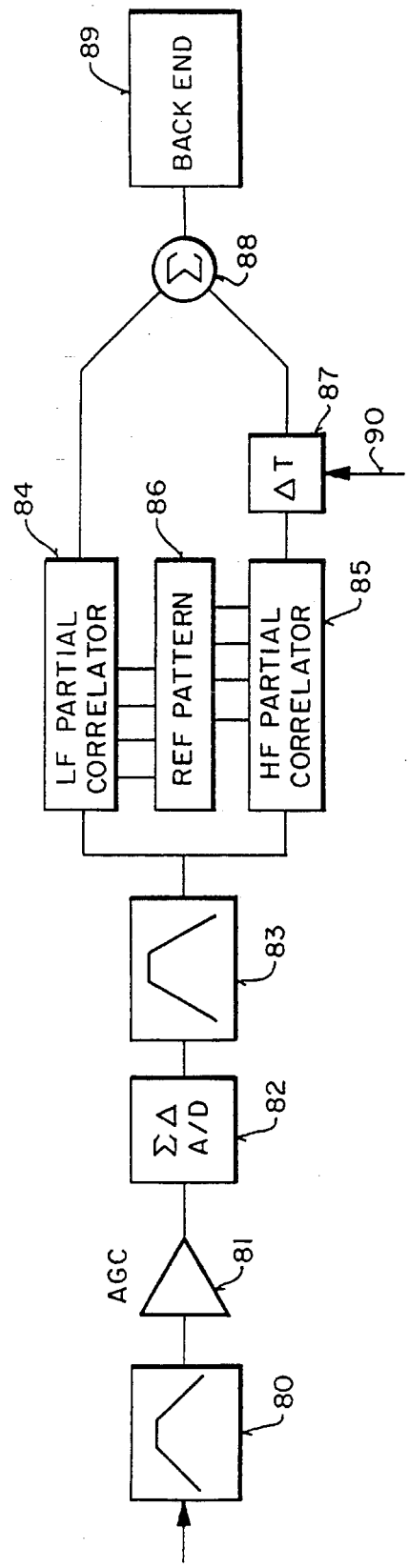
FIG_4

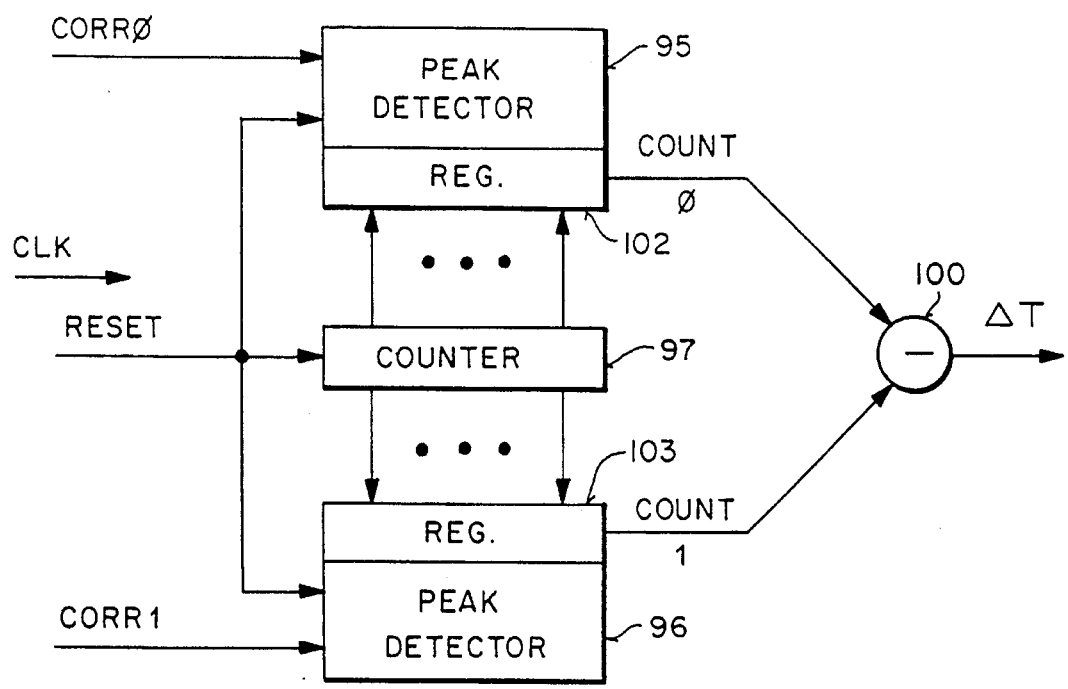
FIG_5
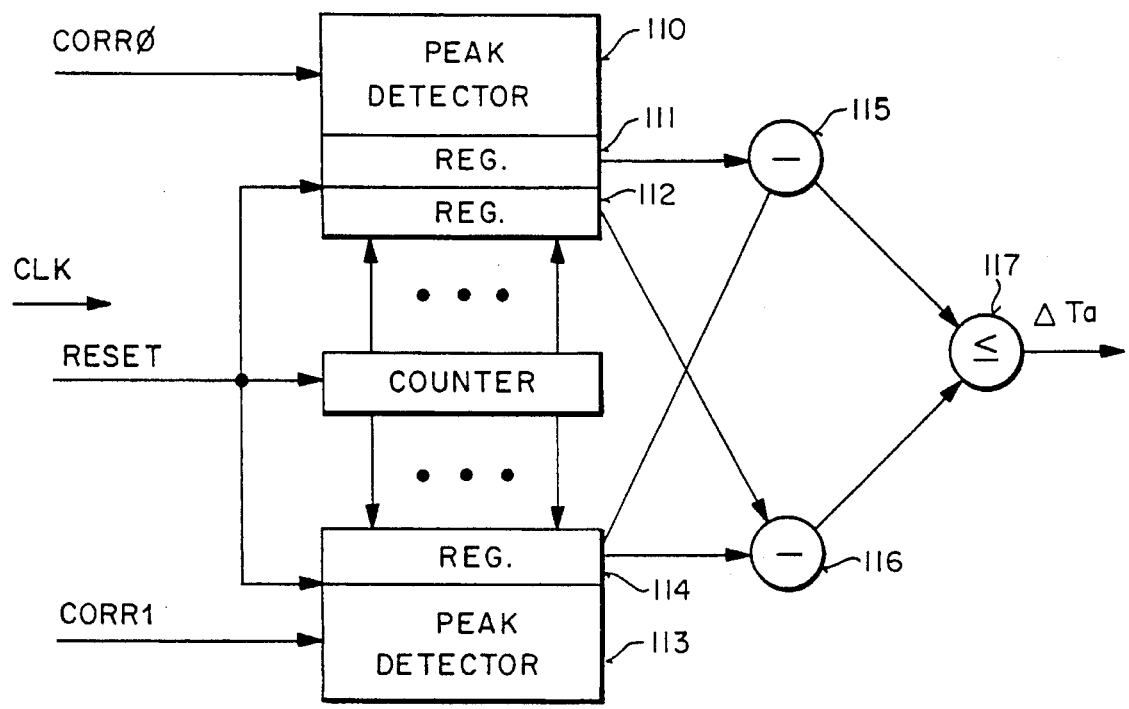
FIG_6

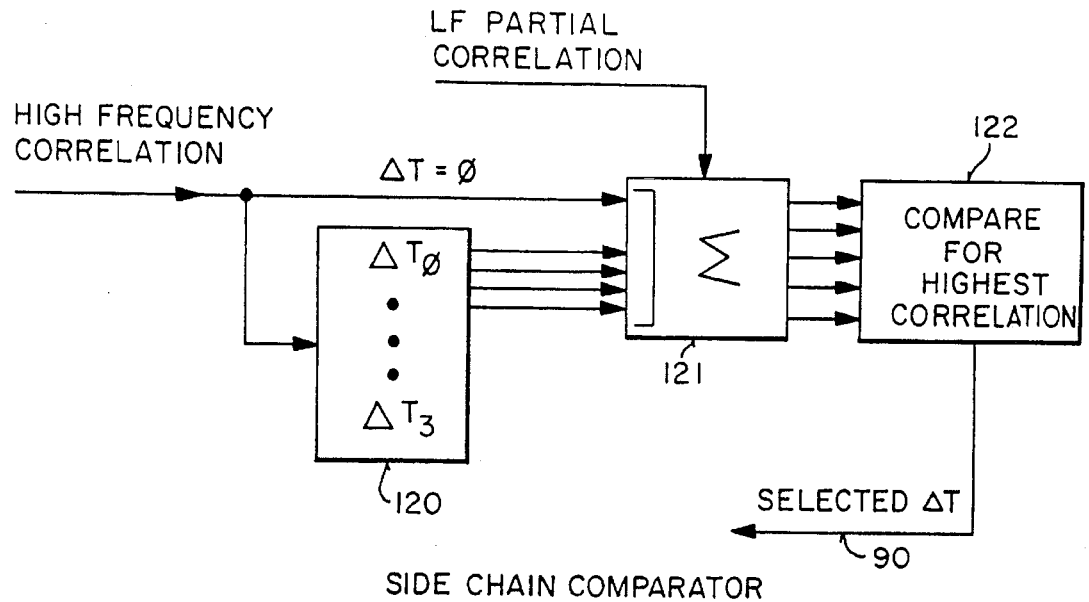
SIDE CHAIN COMPARATOR
FIG _ 7
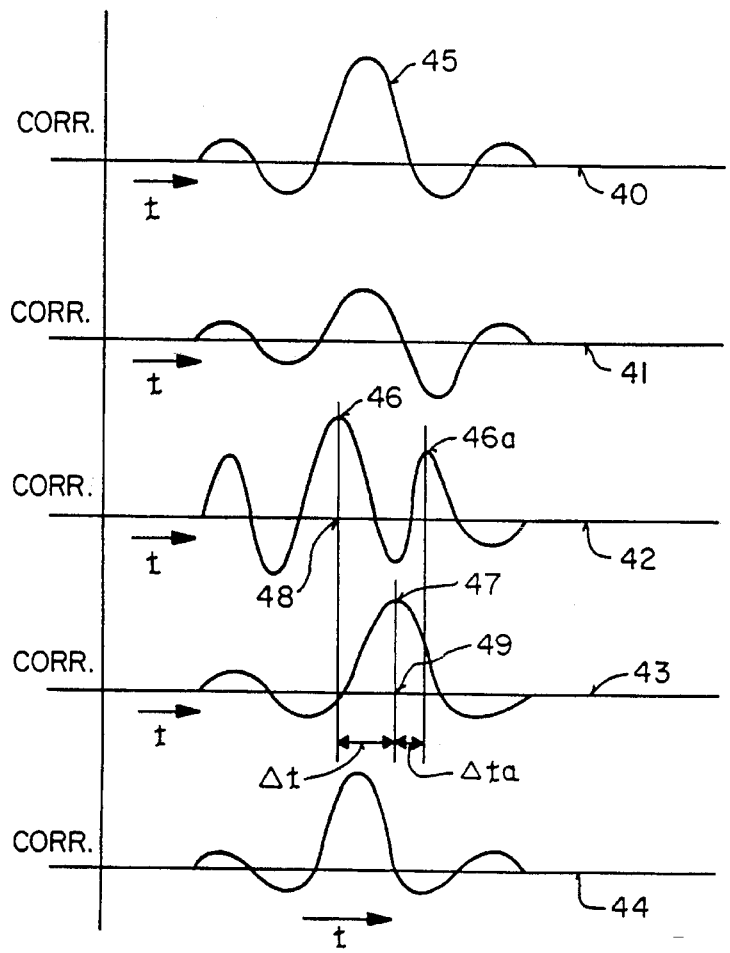
FIG _ 8

SPLIT BAND PROCESSING FOR SPREAD SPECTRUM COMMUNICATIONS

BACKGROUND OF THE INVENTION

1. Field of the Invention

The invention relates to the field of spread spectrum communications.

2. Prior Art

Digital communications over power lines as well as other media using a spread spectrum signal which relies on correlation for the detection of the digital signals is well known. For example, see U.S. Pat. No. 4,979,183. Other examples of such communications can be found in U.S. Pat. Nos. 5,289,498; 5,263,050; 5,090,024; 5,278,862 and 5,359,625.

The spread spectrum signal can in some cases be distorted, particularly on power lines. For example, a power supply in a television can sufficiently distort the signal to cause misdetections. The present invention provides an apparatus and method for dealing with this distortion by, in general terms, dividing or splitting the broad band, spread spectrum signal into sub-bands and separately processing the sub-bands before recombining the sub-bands. The separate processing of signals in different sub-bands is known in the prior art, for example see U.S. Pat. No. 3,112,452. As will be seen the present invention provides a unique method and apparatus for using split-band techniques for spread spectrum communications.

SUMMARY OF THE INVENTION

A method and apparatus for processing a spread spectrum communication signal where digital information is transmitted over a medium such as a power line is disclosed. The method in one embodiment comprises the steps of first separating the information carrying signal (ICS) into at least two sub-bands where each of the sub-bands covers a different predetermined band of the frequencies in the broad band spread spectrum signal. Typically the frequency ranges of the sub-bands approximately cover the frequency band of the ICS. In one embodiment correlation is performed between the ICS in each of the sub-bands and a predetermined pattern. The results of one of the correlations is delayed with respect to the other, and then the results of the two correlations are combined following the delaying. The delay is selected such that it compensates for delay distortion of the communication channel.

In one embodiment, at least one peak (or valley) in each of the sub-bands correlation results is identified. A time relationship between the peaks (or valleys) in the different sub-bands is then determined. In effect, the peaks (or valleys) are realigned to their original (pre-distorted) time relationship.

Other aspects of the present invention will be apparent from the following detailed description of the invention.

BRIEF DESCRIPTION OF THE DRAWINGS

FIG. 1 is a block diagram of a prior art spread spectrum receiver.

FIG. 2 is a block diagram illustrating a spread spectrum receiver built in accordance with the present invention.

FIG. 3 is an alternate embodiment of a spread spectrum receiver built in accordance with the present invention.

FIG. 4 is a another alternate embodiment of a spread spectrum receiver built in accordance with the present invention.

FIG. 5 is a block diagram illustrating one apparatus for determining a time delay used with the present invention.

FIG. 6 is a block diagram illustrating an alternate apparatus for determining the time delay used with the present invention.

FIG. 7 is a block diagram of an alternate apparatus for determining the time delay used with the present invention.

FIG. 8 illustrates a plurality of waveforms helpful to explain the operation of the present invention. The waveforms are illustrations and not intended to show measured or computed waveforms.

DETAILED DESCRIPTION OF THE PRESENT INVENTION

Split band processing for spread spectrum communications is described. In the following description certain specific details are set forth, such as specific frequencies, in order to provide a thorough understanding of the present invention. It will be apparent to one skilled in the art that the present invention may be practiced without these specific details. In other instances, well known structures and techniques such as correlators and correlation are not described in detail in order not to obscure the present invention.

PRIOR ART

FIG. 1 illustrates a prior art power line transceiver (receiver portion). Such transceivers are commercially available from, for example, Echelon Corporation of Palo Alto, Calif. (PLT-10). Various aspects of the transceiver are described in U.S. Pat. Nos. 5,289,498 and 5,263,050.

In general, the analog information carrying signal (ICS) received on a line 11 is filtered by a band pass filter 10. The filter 10 filters out the frequencies above and below the frequency spectrum of the broad band, spread spectrum signal (the ICS). The ICS is then coupled through amplifier 12 and the detection circuit 13 which for instance detects the zero crossings of the ICS thereby quantizing it to a single bit in amplitude. The ICS may then be quantized in time by a sampling process. Within a correlator 15 the quantized digital representation of the ICS is correlated with a stored reference pattern 14. The results of the correlation are examined, and when the correlation value exceeds, for example, some predetermined threshold such as zero, it is detected as a binary one or zero. (A different, higher, threshold value is used for carrier detection.) Other details of the receiver not needed for an understanding of the present invention and which are well known in the prior art are not discussed in this application. In general, the processing following the split band processing of the present invention is simply shown in FIG. 1 and the other figures as "backend" processing 16. This processing is well known prior art processing.

As will be seen, the signal processing of the present invention is used at the receiver of the spread spectrum communications system. The present invention, however, is compatible with prior art transmitters, that is, no change is required to prior art transmitting (encoding) hardware. Frequently, in the prior art one binary state is represented by one predetermined pattern and the other binary state by the inverse image of this pattern. This is consistent with the operation of the present invention.

EMBODIMENT OF THE PRESENT INVENTION OF FIG. 2

Referring now to FIG. 2, the ICS from, for instance, a power line is coupled to a filter 20. This filter, by way of example, may be an analog, band pass filter passing the signal in the frequency band of 100 kHz to 450 kHz. In one embodiment filter 20 has a third order characteristic on the low end of its band pass and a second order characteristic on the high end of the band pass. Filter 20 or portions of it may be implemented as a digital filter where the filter is coupled to receive the output of a digital converter. (The frequency range of 100 kHz to 450 kHz is the broad band frequency range for the ICS in this example and is consequently the frequency band used by the receiver for detecting the encoded digital information.)

The output of the filter 20 is coupled to an automatic gain control circuit 21. In one embodiment this circuit is used because the analog-to-digital converter in the receiver has a limited dynamic range; the circuit 21 places the ICS within the range of the converter. The circuit receives feedback from the output of the filters 23 and 24 for this purpose.

The output of the circuit 21 is coupled to a converter 22 which in one embodiment is a sigma delta converter for converting the analog signal to a digital signal. A converter suitable for this purpose is described in co-pending application Ser. No. 08/205,704, filed Mar. 3, 1994, entitled, "Sigma Delta Converter Having A Digital Logic Gate Core", assigned to the assignee of the present application.

For the described embodiments of the present invention, the ICS is split into two sub-bands. The combined frequency range of the sub-bands covers approximately the entire frequency band of interest (100 kHz to 450 kHz). The low pass digital filter 23 which receives the output of the converter 22 is a finite impulse response filter with a cutoff frequency of approximately 225 kHz. The high pass filter 24 which is also coupled to the output of the converter 22 is again a finite impulse response digital filter passing frequencies above approximately 225 kHz. The output of the filter 23 is coupled to a correlator 26 while the output of the filter 24 is coupled to a correlator 27. Correlation is performed between a reference pattern 25 and the output of the filter 23 within the correlator 26, and similarly, correlation is performed between the output of the filter 24 and a reference pattern 28 within the correlator 27. Well known correlators may be used.

As presently implemented, the reference pattern 25 is determined by injecting an ideal transmit waveform through the path which includes the filter 20, circuit 21, converter 22 and filter 23. For example, an undistorted spread spectrum signal representing a digital one is passed through a simulated model of these components with the output of filter 23 being used as the reference pattern 25. Other known techniques for determining reference patterns for spread spectrum receivers may be used. Similarly, the reference pattern 28 taken at the output of filter 24 represents the undistorted sub-band of the ICS for the same binary state as used for pattern 25. Together the reference patterns 25 and 28 thus represent an ideal binary signal (e.g., a binary one).

In some prior art receivers the two binary states are encoded such that the pattern for one binary state is the inverse of the pattern for the other binary state. This technique is used with the present invention.

The results of the correlation from either or both of the correlators is delayed in time. This is shown in FIG. 2 by the time delay circuit 29 which delays the output of the correlator 27. An ordinary shift register may be used for time delay circuit 29. The shift register delays the results of the correlation in one of the sub-bands for a period of time controlled by the signal on line 32. The generation of the signal on line 32 will be discussed in conjunction with FIGS. 5 through 7. In one embodiment the time delay circuit 29 is a programmable 8 bit wide by 7 bit long shift register allowing seven discrete time delays of 500 μs each. The results of the correlation from correlators 26 and 27 (after the time delay from circuit 29) are summed in summer 30. From there standard processing occurs as shown by "back-end" processing 31 for recovering the binary data.

The operation of the circuit of FIG. 2 can be better understood with reference to the waveforms of FIG. 8. In FIG. 8, five waveforms illustrating the results of correlation are shown on the time axes 40 through 44. Each waveform represents a plurality of correlation values (e.g., 8 bit digital words occurring every 500 μs).

The waveform on line 40 represents a correlation as would occur at the output of correlator 15 for an ICS substantially free of distortion. A distinct peak 45 allows the detection of one of the binary states. The waveform on line 41 illustrates the results of correlation occurring when the ICS is distorted on the medium. As can be seen, it is difficult from this waveform to identify a distinct binary state. In practice in the PLT-10 mentioned above, data decoding is done by correlating polarity at the time of the peak correlation, taking into account the time since the last peak. This minimizes errors caused by distorted waveforms.

The waveform on line 42 illustrates the correlation at the output of, for example, the correlator 27 for a distorted ICS. This is the correlation associated with the higher frequencies of the ICS. The waveform on line 43 illustrated an example of a correlation waveform at the output of the correlator 26 representing the correlation of the lower frequencies of the ICS. Note that the peak 47 of the signal on line 43 is shifted compared to the peak 46 of the waveform on line 42. The shifting is shown as ΔT. As will be seen in the present invention, ΔT is determined or estimated and the waveforms are delayed relative to one another and added such that their peaks are aligned in time.

For the example shown in FIG. 8 the waveform on line 42 is delayed and then added to the waveform on line 43. This is illustrated by the waveform on line 44. As can be seen, the peak of the waveform on line 44 is more distinct than the peaks of waveforms on line 41 and consequently easier to detect.

The circuit of FIG. 2 accomplishes what is shown graphically in FIG. 8. The correlation results at the output of low-frequency correlator 26 (corresponding to the waveform on line 43) are added to the correlation results associated with the higher frequencies (shown on line 42) after the correlation results from correlator 27 have been delayed by a time ΔT. The sum signal (the output of summer 30) represented by the waveform on line 44 is then processed in a well-known manner to detect the information encoded in the ICS.

Dividing the spread spectrum band into two sub-bands as shown in FIG. 2 and delaying the correlation of one band with respect to the other has been found to greatly improve the ability to accurately recover binary data from distorted information carrying signals typically found on a power line. It may be helpful in some applications to divide the spectrum into three sub-bands and to obtain a correlation for each of these sub-bands. Then the results in each sub-band can be delayed for different periods relative to one another before summing. That is, for three sub-bands two delay circuits may be used each capable of providing a different delay. In fact, any number of sub-bands may be used within the teachings of the present invention.

EMBODIMENT OF FIG. 3

In the embodiment of FIG. 3, one sub-band of the ICS is delayed relative to the other sub-band of the ICS. Then summing occurs and the result of the summing is correlated with the reference pattern. This is in contrast to the embodiment of FIG. 2 where results of the correlations are delayed relative to one another before the summing occurs.

Referring now to FIG. 3, the filter 50, automatic gain control circuit 51, converter 52, filter 54, and filter 55 may be the same components as the filter 20, circuit 21, converter 22, filter 23 and filter 24 of FIG. 2, respectively.

The signal at the output of filter 54 is coupled to a digital gain stage (DGS) 56, the gain of which is controlled as will be described. Similarly, the output of the filter 55 is coupled to the DGS 57, the gain of the DGS 57 is also controlled. For an undistorted "ideal" ICS (binary one or binary zero) there is a known amount of relative energy (i.e., known constant ratio) in the sub-bands. The DGSs 56 and 57 are automatically controlled to maintain this ratio. Thus as shown by the arrows 72, the energy in each of the channels is determined and this information is used to maintain this constant ratio by adjusting the gains of the DGSs 56 and 57. Well known circuits may be used to perform this function.

The output of one of the amplifiers is delayed relative to the output of the other amplifiers as shown by the time delay circuit 58. Again, this circuit may be an ordinary programmable shift register the delay of which is determined by the signal on line 75. This corresponds to the time delay circuit 29 of FIG. 2 except that in FIG. 3 the digitized ICS in one of the sub-bands is delayed as opposed to the results of the correlation. The output of the delay circuit 58 and the output of the amplifier 56 are summed in summer 71 and the result of this summing correlated by correlator 60 with a reference pattern 59. Then the "backend" 70 processes the signal to extract the encoded information as in the previous embodiment and as in the prior art. Again circuit 58 provides one of a plurality of discrete delays since a shift register is used which is clocked synchronously with the remainder of the system.

The operation of the circuit of FIG. 3 is similar in principle to the operation described in conjunction with FIG. 2, except that for FIG. 3 the time delay occurs prior to the correlation and the time $\Delta T$ is determined in a different manner.

EMBODIMENT OF FIG. 4

In the embodiment of FIG. 4 the filter 80, circuit 81 and converter 82 may be the same as the filter 50, circuit 51 and converter 52 of FIG. 3, respectively. In this embodiment a digital filter 83 is used to filter the output of the converter 82. In one embodiment this filter is a finite impulse response band pass filter passing the band between 100 kHz to 450 kHz. The output of this filter is coupled to the high frequency partial correlator 85 and the low frequency partial correlator 84.

Note that filter 83 may appear to be redundant in view of filter 80. Filter 83 is needed to remove the quantization noise from the $\Sigma\Delta$ converter 82 before the output of the $\Sigma\Delta$ converter is decimated. The output of the converter 82 (e.g., one bit at 10 MHz) is decimated to improve time resolution. Typically, there may be less decimation in the higher frequency band of the ICS than in the lower frequency band. This is also true for the embodiment of FIG. 2. Thus, fewer samples may be used for the correlator 84 compared to the correlator 85.

The correlators 84 and 85 are ordinary correlators except that correlator 85 correlates the portion of the reference pattern associated with the higher frequencies while the correlator 84 correlates the portion of the reference pattern associated with the lower frequencies. A single reference pattern 86 is used as shown in FIG. 4. However, those portions of the pattern associated with the higher frequencies are coupled to the correlator 85 and those portions of the pattern 86 associated with low frequencies are coupled to the correlator 84.

Again, as in the embodiment of FIG. 2, the output of the correlator associated with the higher frequencies of the ICS is delayed relative to the output of the correlator associated with the lower frequencies of the ICS. Specifically, the output of correlator 85 is delayed by the circuit 87 for a time controlled by the signal on line 90. (The correlation associated with the lower frequencies of the ICS may instead be delayed relative to the correlation associated with the higher frequencies of the ICS. A combination of a fixed delay in one channel and a variable delay in the other channel may also be used.) The circuit 87 may be a shift register as in the other embodiments. The output of the circuit 87 is combined with the output of the correlator 84 in summer 88 to provide a summed signal which is coupled for "backend" processing 89.

The operation of the embodiment of FIG. 4 is similar to that of FIG. 2. Here, however, the sub-band processing is determined by the portions of the reference pattern coupled to each of the correlators. Note that each correlator in FIG. 4 receives the entire digitized ICS. Although, as mentioned, fewer samples need be used for the lower frequency band correlation.

DETERMINING THE TIME DELAY

In general, the signal representing the time delay (e.g., line 32, FIG. 2) is not constant, that is, it is not fixed for a given receiver, particularly for power line application. For example, a source of distortion may be turned on or off necessitating a change in $\Delta T$. Such changes can occur, for example, of a 120 Hz rate where diodes are being turned on and off by a 60 Hz power signal.

Determining the time delay is more difficult when it is necessary to detect a signal (carrier detection) in a single bit time. Generally, this issue is addressed by detecting a signal in one bit time and then verifying it in the next bit time by using a window spaced in time by one bit time (e.g., 5.5 $\Delta$s window). It is desirable that the split-band processing of the present invention be employed for carrier detection and data decoding and ideally the time delay is optimized from one bit time to the next.

In one embodiment $\Delta T$ is selected as the time corresponding to approximately 56° of the carrier of the signal. Then referring to FIG. 4, the output of the correlator 85 is delayed and summed with the output of correlator 84 in the summer 88. Additionally, the output of the correlator 85 is directly summed with the output of the correlator 84, that is, using $\Delta T=0$. The two resultant sums are examined both for positive peaks and negative peaks. The largest value is selected.

Referring to FIG. 7, a side chain comparator is illustrated for determining a $\Delta T$. For the embodiment shown, the output of the high frequency correlator, such as correlator 27 of FIG. 2 or correlator 85 of FIG. 4, is delayed by four discrete times ΔT0 through ΔT3 by the delay circuit 120. The four delayed correlation values are coupled to the summer 121. Additionally, the high frequency correlation without a time delay is coupled to the summer 121. These five values of the high frequency correlation are each summed with the low frequency correlation results within the summer 121. The resultant five sums are examined to detect the highest correlation. The ΔT corresponding to this highest correlation is then coupled to, for example, the delay circuit 87 of FIG. 4. For the embodiment illustrating the side-chain comparator the side-chain comparator is not in the main signal path. The ΔT determined in one bit time is used in the next bit time in the main signal path.

Another technique for determining ΔT is shown in FIG. 5. In general, this technique determines the time interval between the peaks associated with the high frequency and low frequency correlation values. Thus, for FIG. 5 CORR0 may be the values from correlator 26 and CORR1 the values from correlator 27 (in both CORRs only the absolute value is used). In FIG. 5, peak detectors 95 and 96 receive the correlation values and detect if the correlation value being received is higher than a previously received correlation value received within a window. The window is set to correspond to a predetermined period of time during which a peak correlation value is expected. These windows are used in prior art systems. If the correlation value being received is higher than a previous value, the count in the counter 97 present when the higher value is received is loaded into the register associated with that detector. For instance, if the detector 95 receives a correlation value of ten, and previously received a correlation value of eight, when receiving the correlation value of ten, the peak detector loads into the respective register 102 the then current count in counter 97. The counter 97, the registers 102 and 103, and peak detectors 95 and 96 are reset for each window used for detecting the correlation values. The counter 97, counts a predetermined number of counts corresponding to the duration of the window. At the end of each window, subtractor 100 subtracts the counts contained in the registers and this value corresponds to ΔT.

Assume for sake of discussion that the correlation values from correlator 26 are coupled to the peak detector 95 and that the correlation values from correlator 27 are coupled to the peak detector 96. As the digital values representing the waveform on line 43 of FIG. 8 are coupled to the peak detector 96, the count associated with time 49 is stored in register 103 as the peak detector 96 detects the peak 47. Similarly, when the peak detector 95 detects the peak 46, the count associated with this peak is stored within the register 102. These two counts are subtracted from one another in subtractor 100.

In some embodiments, ΔT may be relatively large, and the shift register used for the delay circuit such as delay circuit 29 of FIG. 2, may be undesirably large. It thus may be desirable in some embodiments to use a ΔT associated with a secondary peak, for instance, peak 46a of FIG. 8. Note that ΔTa is a smaller value than ΔT in FIG. 8.

The circuit of FIG. 6 determines a signal representing ΔTa of FIG. 8. The circuit operates in a manner similar to the circuit of FIG. 5 in that it includes two peak detectors, peak detector 110 and peak detector 113. In the case of peak detector 110 there are two registers associated with it, registers 111 and 112. The two highest peak values are stored within these registers. The peak detector 113 of FIG. 6 includes a single register 114 in which the highest peak value is stored.

For FIG. 6, assume that the correlation results represented by the waveform on line 42 are coupled to the peak detector 110 and that the correlation results shown on line 43 are coupled to the peak detector 113. The registers 111 and 112 will store the counts associated with the correlation values for peak 46 and peak 46a since these are the two highest correlation values for the waveform on line 42. The register 114 will store the count associated with the peak 47.

The subtractor 115 subtracts the values stored in the registers 111 and 114, while the subtractor 116 subtracts the values stored in registers 112 and 114. Comparator 117 selects the smaller of the two values from subtractors 115 and 116. This value represents ΔTa.

In operation, the circuit of FIG. 6 operates generally the same as the circuit of FIG. 5 except that one of the two subtractors 115 and 116 will provide the count corresponding to the difference between peaks 46a and 47 while the other will provide the count corresponding to the difference between the peaks 46 and 47. The smaller of these counts will be selected by the comparator 117, this is the count corresponding to ΔTa.

Now when the waveforms on lines 42 and 43 are summed, the peak 46a is aligned with the peak 47 and while not as ideal as aligning peaks 46 and 47 it still provides a significant reduction in waveform distortion while reducing hardware cost.

Thus, a split band technique has been described for compensating for distortion in a communications medium such as a power line for use in a spread spectrum system.

We claim:

1. In a spread spectrum communication system where information is transmitted over a medium on an information carrying signal (ICS) having a broadband frequency spectrum, a method for compensation for distortion in the ICS, comprising the steps of:

separating the ICS into at least two sub-bands, each of the sub-bands covering a different predetermined band of frequencies, the frequencies bands of the sub-bands approximately covering the broadband frequency spectrum of the ICS;

separately correlating the ICS in each of the sub-bands with at least one predetermined pattern;

delaying results of one of the correlations with respect to results of the other correlation;

combining the results of the two correlations after the delaying step;

examining the results of the correlations; and developing a control signal based on the examination of the results of the correlation, the control signal controlling the duration of the delaying.

2. The method defined by claim 1 wherein the delay is one of a plurality of discrete time delays.

3. The method defined by claim 1 wherein the ICS in each of the sub-bands is correlated with a different reference pattern.

4. In spread a spectrum communication system where information is transmitted over a medium on an information carrying signal (ICS) having a broad band frequency spectrum, a method for compensating for distortion in the ICS, comprising the steps of:

performing a first correlation between the ICS and a first predetermined pattern so as to obtain a correlation based on the lower frequencies contained in the ICS;

performing a second correlation between the ICS and a first predetermined pattern so as to obtain a correlation based on the higher frequencies contained in the ICS;

delaying the results of one of the first and second correlations with respect to the other correlation;

combining the results of the two correlations after the delaying step;

examining the results of the first and second correlations; and developing a control signal based on the examination of the results of the first and second correlations, the control signal controlling the duration of the delaying.

5. In a spread spectrum communication system where information is transmitted over a medium on an information carrying signal (ICS) having a broadband frequency spectrum, a method for compensation for distortion in the ICS, comprising the steps of:

separating the ICS into at least two sub-bands, each of the sub-bands covering a different predetermined range of frequencies falling within the broadband frequency spectrum of the ICS;

delaying the ICS in one of the two sub-bands with respect to the ICS in the other sub-band;

combining the ICS in the two sub-bands after the delaying step; and correlating the ICS after the combining step:

wherein the delaying comprises:
delaying one of the two sub-bands with respect to the other sub-band for a period of time where the period of time is selected to obtain a maximum correlation in the correlating step.

6. The method defined by claim 5 wherein the delay is one of a plurality of discrete time delays.

7. In a spread spectrum communication system where information is transmitted over a medium on an information carrying signal (ICS) having a broadband frequency spectrum, a method for compensation for distortion in the ICS, comprising the steps of:

separating the ICS into at least two sub-bands, each of the sub-bands covering a different predetermined band of frequencies, the frequencies bands of the sub-bands approximately covering the broadband frequency spectrum of the ICS;

separately correlating the ICS in each of the sub-bands with at least one predetermined pattern;

identifying at least one correlation peak in the results of the correlation for each of the sub-bands;

determining a time relationship between the correlation peaks in the sub-bands; and delaying results of one of the correlations with respect to results of the other correlation for a period of time based on the time relationship between the peaks; and, combining the results of the two correlations after the delaying step.

8. The method defined by claim 7 wherein the determining of the time relationship comprises the determination of the time relationship between a correlation peak in a second of the sub-bands and a the plurality of correlation peaks n the first of the sub-bands closest in time occurring within a predetermined window to the correlation peak in the second of the sub-bands.

9. In a spread spectrum communication system where information is transmitted over a medium on an information carrying signal (ICS) having a broadband frequency spectrum, a method for compensation for distortion in the ICS, comprising the steps of:

separating the ICS into at least two sub-bands, each of the sub-bands covering a different predetermined band of frequencies, the frequencies bands of the subbands approximately covering the broadband frequency spectrum of the ICS;

separately correlating the ICS in each of the sub-bands with at least one predetermined pattern;

determining one or more parameters of the ICS;

establishing a delay based on the parameter;

delaying results of one of the correlation with respect to results of the other correlation for a period of time corresponding to the delay based on the parameter; and, combining the results of the two correlations after the delaying step.

10. In a spread spectrum communication system where information is transmitted over a medium on an information carrying signal (ICS) having a broad band frequency spectrum, a method for compensating for distortion in the ICS, comprising the steps of:

performing a first correlation between the ICS and a first predetermined pattern so as to obtain a correlation based on the lower frequencies contained in the ICS;

performing a second correlation between the ICS and a first predetermined pattern so as to obtain a correlation based on the higher frequencies contained in the ICS;

identifying at least one correlation peak in the results of each of the first and second correlations;

determining a time relationship between the correlation peaks in the first and the second correlations;

delaying the results of one of the first and second correlations with respect to the other correlation for a period of time based on the time relationship between the peaks; and combining the results of the two correlations after the delaying step.

11. The method defined by claim 10 wherein the delay is one of a plurality of discrete time delays.

12. In a spread spectrum communication system where information is transmitted over a medium on an information carrying signal (ICS) having a broad band frequency spectrum, a method for compensating for distortion in the ICS, comprising the steps of:

performing a first correlation between the ICS and a first predetermined pattern so as to obtain a correlation based on the lower frequencies contained in the ICS;

performing a second correlation between the ICS and a first predetermined pattern so as to obtain a correlation based on the higher frequencies contained in the ICS;

determining one or more parameters of the ICS;

establishing a delay based on the parameter;

delaying the results of one of the first and second correlations with respect to the other correlation for a period of time corresponding to the delay based on the parameter;

combining the results of the two correlations after the delaying step;

examining the results of the first and second correlations; and developing control signal based on the examination of the results of the first and second correlations, the control signal controlling the duration of the delaying.

13. The method defined by claim 12 wherein the delay is one of a plurality of discrete time delays.

14. In a spread spectrum communication system where information is transmitted over a medium on an information carrying signal (ICS) having a broadband frequency spectrum, a method for compensation for distortion in the ICS, comprising the steps of:

separating the ICS into at least two sub-bands, each of the sub-bands covering a different predetermined range of frequencies falling within the broadband frequency spectrum of the ICS;

measuring one or more parameters in the ICS;

establishing a delay based on the measured parameter;

delaying the ICS in one sub-band with respect to the ICS in the other sub-band for a period of time corresponding to the delay based on the parameter;

combining the ICS in the two sub-bands with respect to the ICS in the other sub-band; and, correlating the ICS after the combining step.

* * * * *